United States Patent

Gerst et al.

[11] Patent Number: 5,272,836
[45] Date of Patent: Dec. 28, 1993

[54] SYSTEM FOR OPENING AND CLOSING A TWO-PART WINDOW FOR A VEHICLE CAB

[75] Inventors: Karl-Heinz Gerst, Böblingen; Bernhard Nekum, Oberriexingen, both of Fed. Rep. of Germany

[73] Assignee: Dr. Ing. h.c.F. Porsche AG, Weissach, Fed. Rep. of Germany

[21] Appl. No.: 889,586

[22] Filed: May 28, 1992

[30] Foreign Application Priority Data

May 28, 1991 [DE] Fed. Rep. of Germany ....... 4117424

[51] Int. Cl.[5] ............................................. E05D 15/26
[52] U.S. Cl. .................................... 49/126; 296/96.21
[58] Field of Search ................... 49/98, 125, 126, 127, 49/213; 296/89, 96.21, 155

[56] References Cited

U.S. PATENT DOCUMENTS

| 1,872,489 | 8/1932 | Mitchell | 49/126 X |
|---|---|---|---|
| 3,763,594 | 10/1973 | Banzei | 49/126 |
| 4,072,338 | 2/1978 | Lawrence et al. | 296/89 X |
| 4,518,195 | 5/1985 | Tindall et al. | 49/126 X |
| 4,792,175 | 12/1988 | Gerber | 296/96.21 |
| 5,029,937 | 7/1991 | Yamamoto | 49/127 X |

FOREIGN PATENT DOCUMENTS

| 2712823 | 9/1978 | Fed. Rep. of Germany . |
| 3150786 | 7/1983 | Fed. Rep. of Germany . |
| 3816779 | 11/1989 | Fed. Rep. of Germany ........ 296/89 |
| 2256049 | 10/1974 | France . |
| 2206631 | 1/1989 | United Kingdom . |

Primary Examiner—Peter M. Cuomo
Assistant Examiner—Jerry Redman
Attorney, Agent, or Firm—Evenson, McKeown, Edwards & Lenahan

[57] ABSTRACT

A system for the opening and closing of a two-part front window for the cab of a vehicle, particularly an excavator, has an upper pane and a lower pane. The lower pane can be moved via rollers between guide rails into a raised opened position and into a lowered closed position, and both panes can be swivelled jointly into a lockable clear-view position arranged below the cab roof. The bottom pane, extending flush with respect to the top pane in the closed position, is held on the lower and upper guide rails in a supported manner.

8 Claims, 5 Drawing Sheets

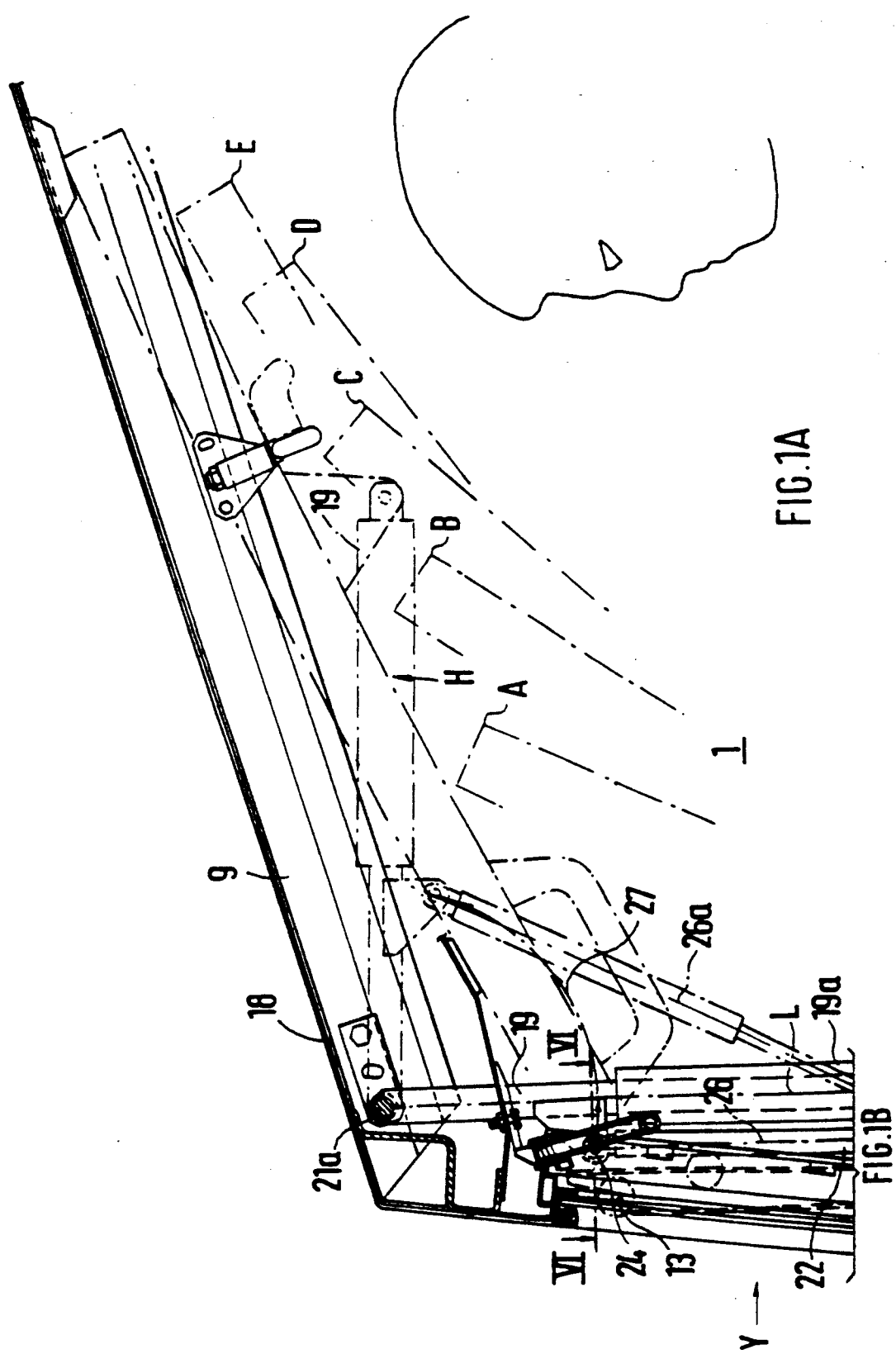

SYSTEM FOR OPENING AND CLOSING A TWO-PART WINDOW FOR A VEHICLE CAB

BACKGROUND AND SUMMARY OF THE INVENTION

The present invention relates to a system for the opening and closing of a two-part front window for the cab of a vehicle, particularly an excavator, having an upper and a lower pane. The lower pane, via rollers between guide rails, is movable into a lifted opened position and into a lowered closing position. Both panes are jointly able to be swivelled into a lockable clear-view position arranged under the cab roof.

From the German Patent Document DE-OS 31 50 786, a cab for a vehicle is known which has a two-part front window which comprises panes that are arranged vertically offset with one another. For the opening of the front window, the bottom pane can be moved vertically behind the top pane and both panes can be swivelled in guides under the roof of a cab. Furthermore, on the basis of the German Patent Document DE-OS 27 12 823, a one-part window for a cab is known which can be moved under the roof by means of a guiding rod and with the aid of a pneumatic spring.

An object of the invention is to provide a front window for a vehicle which permits optimal viewing conditions and which has panes that can be adapted to the respective working conditions in a simple manner and which ensure by way of guiding devices a common swivelling under the roof which does not hinder the driver.

This and other objects are achieved by the present invention which provides a system for opening and closing a two-part front window for the cab of a vehicle having an upper pane and a lower pane, and lower and upper guide rails and rollers. The lower pane is movable via the rollers between the guide rails into a lifted opened position and into a lowered closing position. The top and bottom panes are jointly swivellable into a lockable clear-view position under the cab roof. The bottom pane extends flush with respect to the top pane in the closed position and is held in a supported manner on the lower and upper guide rails.

Some of the advantages achieved by means of the invention are that the first lower guide rails of the bottom pane have a construction which permits a shifting as well as a swivelling about lower guide rollers for taking up a shifted position and a flush closed position. According to the German Patent Document DE-OS 31 50 786, such a possibility does not exist because of the rigid offset arrangement of the bottom pane with respect to the top pane.

The swivelling capacity of the bottom pane is achieved by a sliding plate which extends transversely with respect to the running path of each guide rail and introduces the upper roller into the vertical running path. At the same time, the slide plate interacts with a catch of a locking device so that, in the flush position of the two panes, the bottom pane is arrested in this position.

For a joint swivelling of the bottom pane together with the top pane under the roof of the cab, the upper guide rails of the bottom pane are fixedly connected with the top pane so that a swivel unit is formed which includes the top pane, the bottom pane as well as the pertaining guide rails.

So that the driver is not disturbed by the swivelling of this unit under the roof or need not duck his head when this unit is swivelled, the running paths of the guide rails of the top pane have a correspondingly curved design. This curvature is more pronounced in the lower area of the pane than in the upper area. As a result, a swivel path is achieved which results in a curved running course with respect to the driver's head at a relatively large distance.

For the swivelling restricted guiding of the unit, at least one control rod is also provided which is pivotally connected to the upper frame of the body structure and is, in each case, connected with the upper guide rails of the bottom pane. For aiding the swivelling movement, at least one pneumatic spring is used which is supported on the lateral frame of the body structure and is disposed on the control rod. With a rising swivel angle of the unit, the line of force of the pneumatic spring extends such that the opening into the clear view position is supported by the force.

Other objects, advantages and novel features of the present invention will become apparent from the following detailed description of the invention when considered in conjunction with the accompanying drawings.

BRIEF THE DRAWINGS

FIG. 1 A is a lateral view of the front panes with the guide rails . to an embodiment of the present invention.

FIG. 1 B a lateral view of the front panes with the guide rails from the interior of the cab.

FIG. 2 sectional view of a bottom pane with the guide rails according Line II—II of FIG. 1 B.

FIG. 4 is a sectional view of the top pane with the control rod and the pneumatic spring according to Line V—V of FIG. 1 B.

Figure 7:
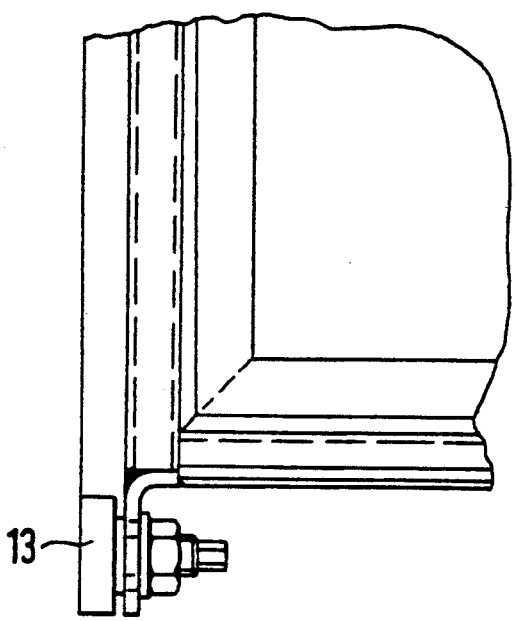
FIG. 7 is a view of a lower roller of the top pane viewed in the direction of the arrow G of FIG. 1 B.
Figure 8:
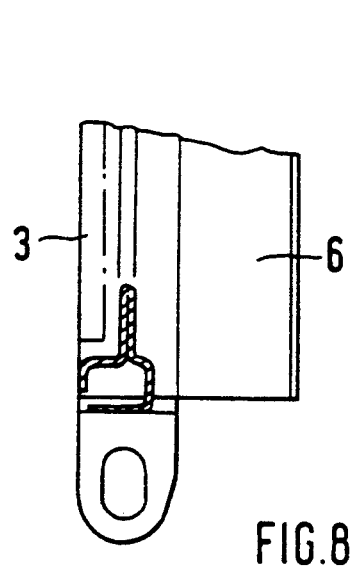

FIG. 8 sectional view according to Line VIII—VIII of FIG. 7.

Figure 9:
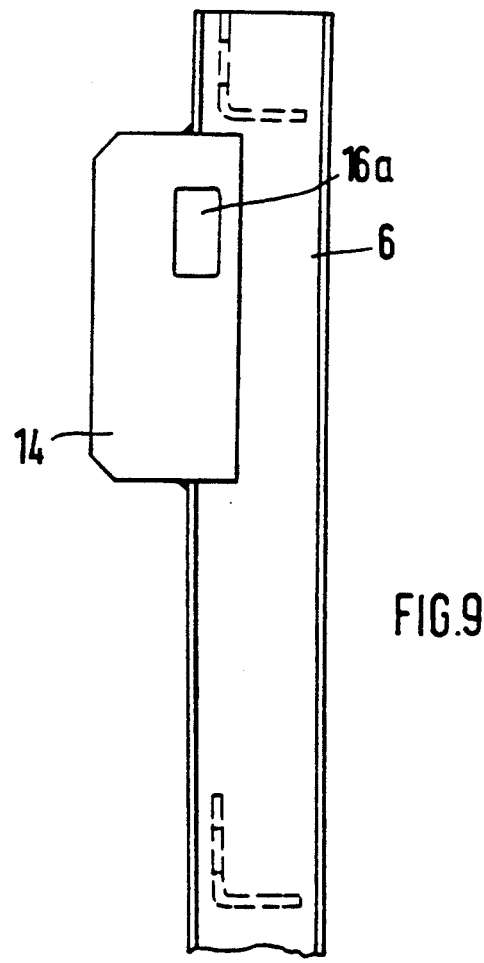

FIG. 9 view of a segment of the first lower guide rail with the slide plate.

DETAILED DESCRIPTION OF THE DRAWINGS

The cab 1 of a vehicle or an excavator has a horizontally divided front window 4 comprising a bottom pane 2 and a top pane 3. The two panes 2 and 3 are arranged flush with respect to one another; that is, they form a continuous pane surface without any steps.

The two panes 2 and 3 are each slidably arranged between lateral guide rails 5, 6 and 7. For this purpose, the lower pane 2 has first lower guide rails 6 as well as connecting second upper guide rails 7, between which the guide rails 5 of the top pane 3 are arranged.

Figure 1B:
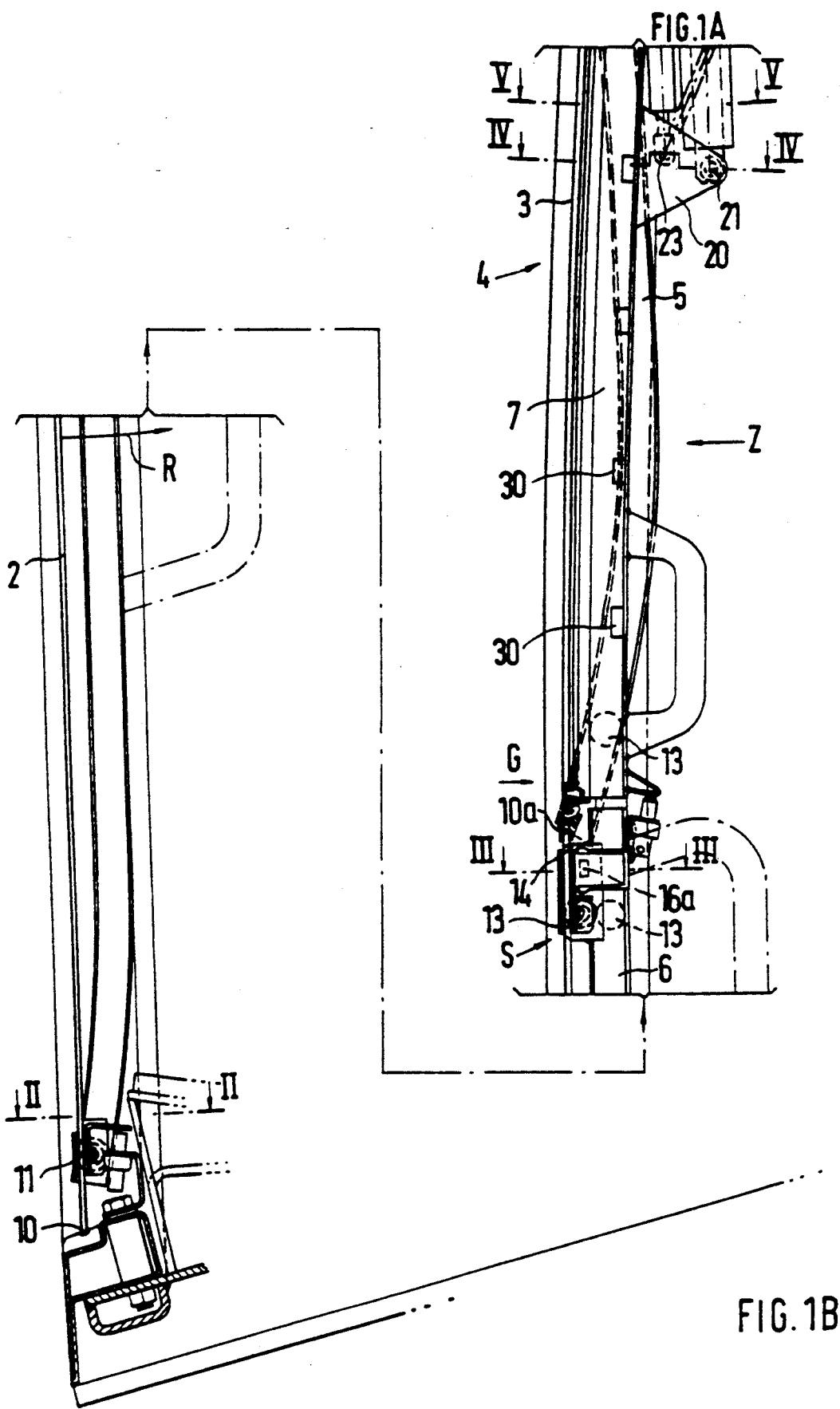
Figure 2:
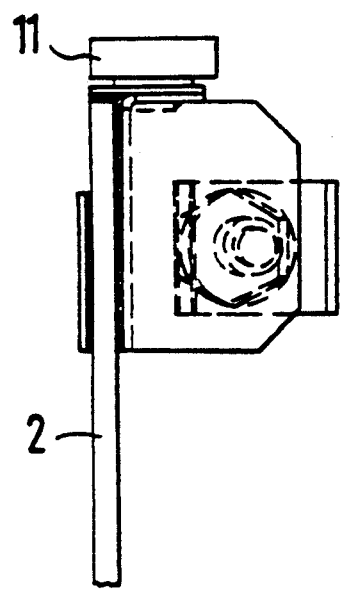
Figure 3:
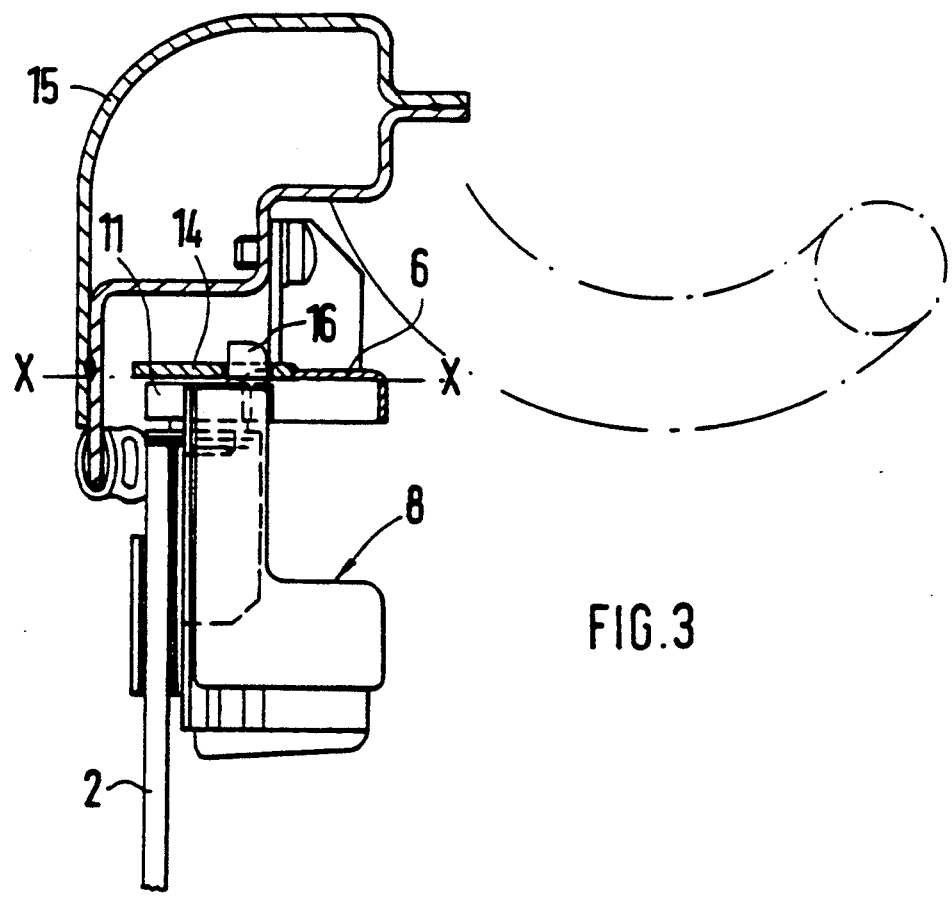
FIG. 3 is a sectional view of the area of the upper guide roller according to Line III—III of FIG. 1 B.

Pane 2 is held in the lower guide rails 6 by a locking device 8 in a flush closed position S with respect to the top pane 3, as shown in detail in FIGS. 1 and 3. After an unlocking, the pane 2 can be swivelled into a foldedback preparatory position (indicated by a dash-dotted line) for the vertical opening.

For providing a clear-view position, the two panes 2 and 3 are swivelled jointly and take up a position behind one another so that the panes can be swivelled as a unit into a position below the roof 9 of the cab, and the unit takes up the position H shown in FIG. 1.

In the closed and locked position of the bottom pane 2, the rollers 11 assigned to the lower pane edge 10 are disposed in the first lower guide rails 6 fastened to the frame 15 of the body structure. The rollers 13, which are assigned to the upper pane edge 10a, are held outside the running paths of the guide rails 6 in each case on a slide plate 14, in which case pane 2 is locked by the locking device 8 in this flush position.

This arrangement 8 comprises essentially a "catch" 16 (FIG. 3) which locks into a corresponding recess 16a (FIG. 1 A) of the slide plate 14. For forming a guide for the rollers 11, this slide plate 14 is arranged in a plane X—X with the web of the U-profile of the guide rails 6. It extends transversely to the running path of the guide rails 6 and is open laterally for the swivelling-in of the upper roller 13 about the lower roller 11, which is shown by a dash-dotted line in FIG. 1. This arrangement of the roller 13 permits an approximately vertical shifting of the bottom pane 2 in the vertical direction into the connecting second upper guide rails 7 which are arranged behind the top pane 3 and are fixedly connected with it.

Between the two second upper guide rails 7 for the top pane 3, additional guide rails 5 are arranged for the swivelling unit comprising essentially the top pane 3, the bottom pane 2 and the guide rails 7.

The running paths of the guide rails 5, with respect to the top pane 3, are convexly curved toward the inside in the direction of the driver in such a manner that the lower area Z is constructed in a more pronounced manner with a smaller radius than the connecting upper area Y. This permits a restricted guiding of the unit for the swivelling under the roof while a relatively large clearance is achieved with respect to the driver's head, as indicated in detail by corner points A, B, C, D and E of the unit in FIG. 1.

Figure 4:
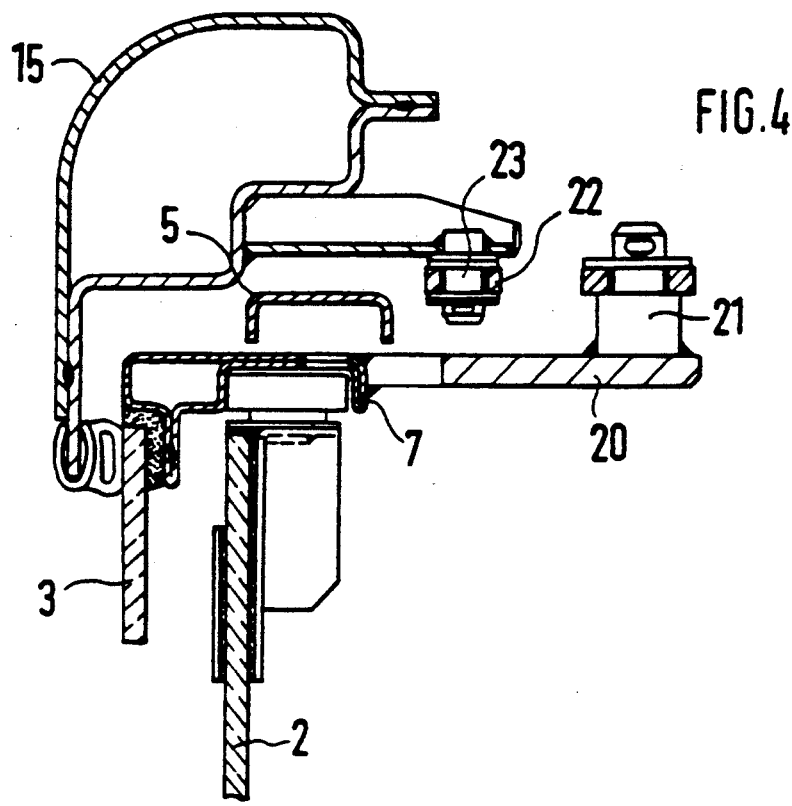
FIG. 4 is a sectional view of a top pane with the guide rail as well as a pivotal control rod connection according to Line IV—IV of FIG. 1 B.
Figure 5:
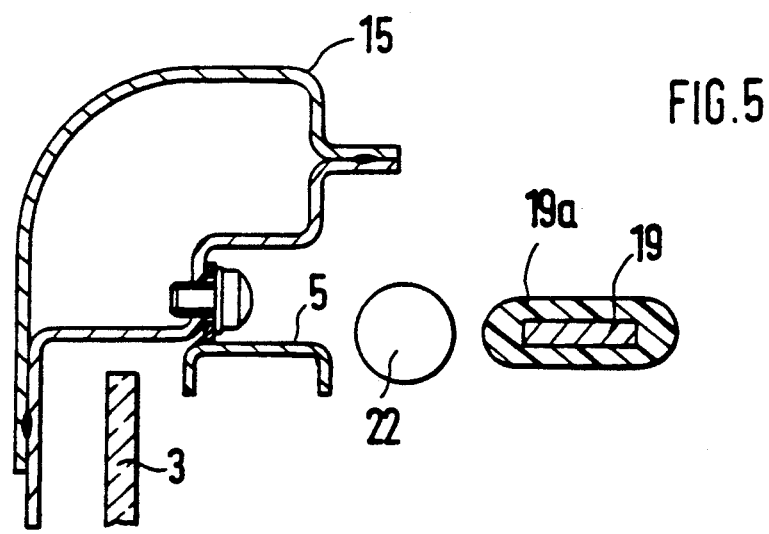

For the pivotal connection of the unit for the swivelling, at least one control rod 19 is supported in a bearing 21a in an articulated manner on the upper frame 18 of the body structure, this control rod 19 being pivotally held on the second upper guide rail 7. For this purpose, a sheet metal plate 20 is fastened to the rail 7 and receives the bearing 21, which is illustrated in detail in FIG. 4. The control rod 19 is elastically covered by means of a shell 19a (FIG. 5).

Figure 6:
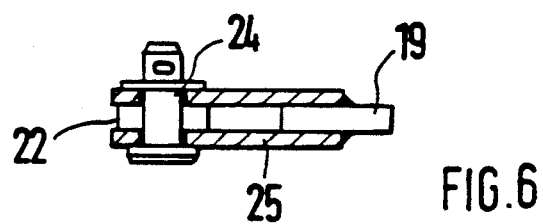
FIG. 6 is a sectional view in the area of an upper roller of the top pane of the pivotal connection of the pneumatic spring.

For an easier swivelling of the unit under the roof, at least one pneumatic spring 22 is arranged between the top pane 3 and the control rod 19—viewed in the lateral view of FIG. 1 A. It is supported in an articulated manner in the area of the lower pivotal connection 21 of the control rod 19 on the guide rail 7 on the lateral frame 15 of the body structure in the bearing 23. In contrast, the upper end of the pneumatic spring 2, which faces away, is pivotally held on the control rod 19 in a bearing 24 in a plate 25 (FIG. 6).

The pneumatic spring 23 has a line of force 26 which is determined by the two bearings 23 and 24. When the unit 2, 3 and is swivelled under the roof, the position of the line of force 6 changes because the upper bearing point 24 of the pneumatic spring 22 moves on the circular arc 27 (FIG. 1 A). As a result, after a relatively small swivel angle of the unit, the line of force 26 will extend beyond the dead center position (bearing point 21a) into an over-dead-center position so that the line of force 26a causes a force support which is indicated by a dash-dotted line.

The bottom pane 2 can be locked in various positions, for which detents 30 are used in the second upper guide rail into which the catch 16 of the locking device 8 will then lock. The unit which is swivelled under the roof can also be locked.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for opening and closing a two-part front window for the cab of a vehicle comprising:

a top pane and a bottom pane; and lower and upper guide rails and rollers, the lower pane being movable via said rollers between said guide rails into a lifted opened position and into a lowered closing position, and the top pane and bottom pane jointly being swivellable into a lockable clear-view position under a roof of the cab;

wherein the bottom pane extends flush with respect to the top pane in the closed position and is held in a supported manner on the lower and upper guide rails;

wherein the bottom pane, with respect to the lower guide rails, can be swivelled about rollers on a lower pane edge;

further comprising additional guide rails connecting to the lower guide rails and that are arranged in an area of the top pane and are fixedly connected with the top pane, the additional guide rails for the top pane being provided between the upper guide rails for the bottom pane and forming a swivel unit with the bottom pane as well as the upper guide rails, the additional guide rails of the swivel unit, with respect to the top pane, having concavely curved running paths for rollers, with curvatures of the running paths in the guide rails in a lower area of the top pane being more pronounced and with a smaller radius than curvatures of the running paths that have a larger radius in an upper area of the top pane.

2. A system according to claim 1, wherein the guide rails have a U-profile-shaped cross-section, and each rail, in the area of rollers assigned to an upper pane edge, has a slide plate extending transversely with respect to the running path of the guide rail, the slide plate extending in a web plane of the guide rail.

3. A system according to claim 2, further comprising a locking device with a catch, and wherein the slide plate comprises a recess corresponding to the catch of the locking device, and the pane is held in the closed position by the catch.

4. A system according to claim 1, further comprising at least one control rod for the swivel unit supported on an upper frame of the a body structure of the vehicle in a first bearing and pivotally connected with the upper guide rail of the bottom pane by a second bearing.

5. A system according to claim 4, further comprising between the top pane and the control rod, at least one pneumatic spring which, in the area of the lower pivotal connection of the control rod on a lateral frame of the body structure is supported in a bearing and, with its end facing away, is pivotally held on the control rod in an additional bearing.

6. A system according to claim 5, wherein the pneumatic spring, in the closed position of the two panes, has a line of force extending approximately in parallel with respect to a control rod axis, the line of force changing continuously as a swivel angle of the unit increases, from a position situated in front of dead center, to a force-supporting over-dead-center position.

7. A system according to claim 1, wherein the guide rails have a U-profile-shaped cross-section, and each rail, in an area of rollers assigned to an upper pane edge, has a slide plate extending transversely with respect to the running path of the guide rail, the slide plate extending in a web plane of the guide rail.

8. A system according to claim 7, further comprising a locking device with a catch, and wherein the slide plate comprises a recess corresponding to the catch of the locking device, and the lower pane is held in the closed position by the catch.

* * * * *